United States Patent [19]
Knibbe

[11] Patent Number: 5,565,855
[45] Date of Patent: Oct. 15, 1996

[54] BUILDING MANAGEMENT SYSTEM

[75] Inventor: Engel J. Knibbe, Eindhoven, Netherlands

[73] Assignee: U.S. Philips Corporation, New York, N.Y.

[21] Appl. No.: 321,076

[22] Filed: Oct. 11, 1994

Related U.S. Application Data

[63] Continuation of Ser. No. 869,410, Apr. 16, 1992, abandoned.

[30] Foreign Application Priority Data

May 6, 1991 [EP] European Pat. Off. ............. 91201071

[51] Int. Cl.$^6$ .......................... G05B 23/02; G08C 19/00
[52] U.S. Cl. ................. 340/825.06; 340/310.02; 340/825.69; 340/825.22; 364/464.01
[58] Field of Search .................... 340/825.69, 825.6, 340/825.06, 310 A, 825.22, 825.37, 310.02, 309.4; 364/464.01; 235/383; 359/142

[56] References Cited

U.S. PATENT DOCUMENTS

| | | | |
|---|---|---|---|
| 4,386,436 | 5/1983 | Kocher et al. | 455/151 |
| 4,755,792 | 7/1988 | Pezzolo et al. | 340/825.06 |
| 4,766,295 | 8/1988 | Davis et al. | 235/383 |
| 4,847,781 | 7/1989 | Brown, III et al. | 340/825.06 |
| 5,086,385 | 2/1992 | Launey et al. | 340/825.69 |

FOREIGN PATENT DOCUMENTS 0516210  5/1992  WIPO .............................. H04M 9/02

OTHER PUBLICATIONS

Infrared Local Area Network, Mar. 1991, IBM Technical Disclosure Bulletin vol. 33 No. 10 B pp. 270–271.
George Hanover, Networking the Intelligent Home, IEEE Spectrum Magazine, Oct. 1989, pp. 48–49.
F. William Gutzwiller, Control Networks for the Home, Oct. 20, 1983 pp. 109–112, Machine Design Magazine, Industry Standards Staff, General Electric Company, Fairfield CT 06431.
IBM Technical Disclosure Bulletin, vol. 33 No. 10 B Mar. 1991 pp. 270–272.

*Primary Examiner*—Michael Horabik
*Assistant Examiner*—Edward Merz
*Attorney, Agent, or Firm*—Laurie E. Gathman

[57] ABSTRACT

A building management system improves the regulation and controls the functioning of appliances (41, 42, 51), such as luminaires, window blinds and heating equipment in a building. The appliances are connected via a communication bus (20) to a control system (10), which performs the automatic regulation and control. To avoid rewiring the bus (20) every time that changes are made to the arrangement of the appliances and/or the lay-out of the building, transponders (40, 50) are mounted at regular fixed places in the building, which transponders transmit bus signals wirelessly to the appliances (41, 42, 51). Additionally the transponders may be provided with a receiver (50a) for two-way communication between appliances and system and for communication between the user and the system using a remote control unit (59).

21 Claims, 2 Drawing Sheets

5,565,855

BUILDING MANAGEMENT SYSTEM

This is a continuation of application Ser. No. 07/869,410, filed Apr. 16, 1992, now abandoned.

FIELD OF THE INVENTION

The invention relates to a building management system, including various appliances for building service functions, a control system for control and regulation of the appliances, and a communication bus for communication of signals between the control system and the appliances. Such a system is used for the central management of building functions, such as fighting, heating, ventilation etcetera. The appliances include, for example, luminaires, heating equipment, air-conditioning devices or electrically movable window blinds. In buildings like offices, and commercial and industrial complexes, the central management of energy consuming services allows a relatively easy adjustment of the level of light or temperature to the actual existing demand at any moment. This results in considerable savings of energy and costs. Such a system precisely monitors energy consumption and enables accurate charging of the users in a multi-user building. Such a building management system can also be used for peak saving purposes to comply with the requirements of an electric company to keep power consumption below an agreed maximum level.

BACKGROUND OF THE INVENTION

An example of building management system according to the introductory paragraph is described in the brochure "IFS 800 Lighting control system" published by Philips Lighting. In this system each appliance, such as a luminaire, a heating or cooling device or a fan in a space, such as a room, office or shop area, is coupled with a central control system via a communication bus. In this particular system each appliance is controlled by a local controller unit which is connected to the communication bus and regulated by signals from the central control system. The local controllers comprise the necessary electronics for adjusting several appliances to required levels. An occupant of the space communicates a change of the desired levels to the control system by means of infra-red (IR) signals transmitted by a portable IR remote-control unit to an IR-receiver connected to the communication bus. Further, the known system allows additional determination of the desired levels by use of sensors, such as a presence detector, a thermometer or a light sensor.

Another known building management system, suitable for small complexes such as shops and restaurants, is the BatiBUS/ISIS system, commercialized by the company Merlin Gerin, Meylan, F-38240 France. In this system each appliance includes its own local controller which is connected to the communication bus. Security and alarms can be incorporated in this known system.

In the known systems the local controllers and the appliances are connected to the communication bus by wires. In a modem office building or commercial complex this is a drawback as spaces are often changed. Changing virtually always requires displacement of the appliances and often also tearing down and rebuilding of internal walls. To achieve a flexible floor lay-out at low cost, a minimum of wiring in the walls is required. However, it is also required by the users of a building to have full control over the location of the appliances, consequently placing appliances on predetermined spots only is unacceptable.

SUMMARY OF THE INVENTION

It is, inter alia, an object of the present invention to provide a building management system for controlling appliances in a space such as an office or a shop, which system does not need rewiring when appliances are displaced, additional appliances are added to or appliances are removed from a space. The system thereby allows flexible positioning of appliances together with a maximum control by the control system.

To this end a system according to the invention is characterized in that at least one appliance comprises a receiver for receiving wirelessly transmitted signals, and in that at least one transponder is coupled to the communication bus for wirelessly transmitting signals to said appliance in response to signals present on the communication bus. The communication or control signals that are emitted by the control system to the appliances are transmitted via the communication bus to a location near the appliance, and from there wirelessly to the appliance. Wiring for the last several meters towards the appliance is not required and the exact position of the appliance, provided it being within reach of the signals transmitted wirelessly by the transponder, is of no relevance to the transmission of these signals. Adding a new piece of equipment in the space, for example a free standing luminaire, does not need an extension of the communication bus to that new piece of equipment for incorporating it in the system.

The transponder may be suitable for one particular appliance only or for a specific type of appliance, but preferably the transponder is constructed to transmit signals for all kinds of appliances used within the framework of a building management system. Transponders can be fixedly arranged at regular distances inside a building, for example in the ceilings, and no wiring changes are needed when the internal lay-out of the building is changed. Several appliances can be reached simultaneously and served by signals from one transponder.

An embodiment of a system according to the invention is characterized in that the transponder includes a transmitter for generating signals for wireless transmission and a processor for conversion of signals received via the communication bus into a format suitable for wireless transmission, wherein the processor is arranged for holding back signals which are not meant for the appliances reached by the wireless transmission of signals via the transponder. The system can also be modular. The central control system does not need to have detailed information about the kind of signals necessary to adjust or control each individual appliance. In addition, an appliance is to be addressed via its transponder, so the appliance itself need not have a unique address within the complex. Interchanging of appliances between different rooms is thereby facilitated. Also signals on the communication bus which are not intended for the appliances served by a particular transponder will not be transmitted to those appliances. As in a large complex many signals are transmitted via the communication bus, unnecessary activation of transmitters and possible unintentional activation of an appliance by a combination of "background" signals is thereby avoided. As the building management system serves a large number of appliances and the transponders each only a limited number of appliances, as a further advantage, a "filter" in the transponder allows transmission by the transponder to occur at a lower rate than communication in the bus, making the system as a whole faster because different transponders may be transmitting different signals concurrently.

A preferred embodiment of a system according to the invention is characterized in that at least one appliance is provided with a transmitter for wireless transmission of signals, and in that the transponder comprises a receiver for receiving wirelessly transmitted signals. Two-way communication between the control system and the appliance is herewith possible. For example, the processor may request status information from the appliance or the appliance can signal malfunctioning.

A further embodiment of a system according to the invention is characterized in that the at least one appliance comprises means for transmitting an acknowledgement signal after receipt of a signal from the transponder and the transponder repeats the previously transmitted signal when no acknowledge signal is received. Control of the functioning of an appliance is performed at a local level by the processor in the transponder. When the signal is not transmitted correctly to the appliance, the signal is repeated automatically. No additional bus signals are necessary, thereby reducing the data load on the communication bus.

Another embodiment of a system according to the invention is characterized in that the system further comprises a portable remote control unit for wireless transmission of signals to the appliances. The occupant in a room can change the setting of an appliance directly without communication with the control system and additional data load on the communication bus. Preferably, status information about the new setting is sent to the control system, immediately or upon request.

In addition, this embodiment of a system according to the invention can be characterized in that the transponder comprises a receiver for receiving signals wirelessly transmitted by the remote control unit and in that the transponder comprises a device for retransmission of a signal received from the remote control unit, via the communication bus or via the transponder's wireless transmitter. Communication between a user or occupant of a building or room and the control system is done via the transponder and the communication bus. No other way of communication, such as calling a system manager or operator, is normally necessary. This is, for example, desirable when a room is used outside normal hours to inform the system that lighting and heating should stay switched on. In a more developed embodiment the processor in the transponder and/or the control system can be (re)programmed via the remote control unit. Retransmission of received signals via the transponder's transmitter allows amplification of signals emitted by the remote control unit to ensure proper reception by the appliances.

An embodiment of a building management system according to the invention is further characterized in that the transponder comprises means for filtering and modification of a signal received from the remote control unit prior to retransmission thereof. Herewith it is possible to use a simple remote control unit, whereby the appliances which are activated by use of the remote control unit are selected by the control system.

A further embodiment of a system according to the invention is characterized in that the remote control unit is provided with a receiver for receiving signals wirelessly transmitted by the transponder and a display for displaying thereupon messages transmitted by signals. Two-way communication between the transponder and a remote control unit allows the user of the remote control unit to obtain information about the building management system and the status of the appliances near him. It is known, for example, from GB-A 2 166 328, that information is transmitted about the status of a device to a remote control unit via a communication bus and a transponder. However, in the known system the equipment is directly connected to the communication bus and the transponder is arranged to communicate with the remote control unit only. This known system is not a building management system and does not comprise a control system, A preferred embodiment of a system according to the invention is characterized in that a transponder comprises an infra-red transmitter, and the appliance comprises an infra-red receiver and the ratio between the power of infra-red signals transmitted by said transmitter and the minimum power for activation of the receiver is at least of the order of magnitude of $10^8$. In order to allow maximum flexibility in changing the lay-out of a building, the transponder preferably is not to be arranged in walls. Internal walls are easily removable, while external walls may be too far away from the appliances in a building, therefore the preferred place for a transponder is in the ceiling. As the receiver in an appliance should be reached also by a remote control unit held at about one meter above the floor anywhere in the space, the orientation of the receiver cannot be optimized for receiving signals from the direction of the transponder. In this embodiment the transmitter in the transponder emits a signal sufficiently strong that even after reflection at surfaces of equipment or at the walls the signal is successfully transmitted. The indicated ratio allows a transmission path with a length of about 6 meters with a 90% energy loss due to reflections. It was found that this is sufficient for a conventional office environment.

These and other, more detailed, aspects of the invention will be apparent from and elucidated with reference to the drawings and embodiments described hereinafter.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
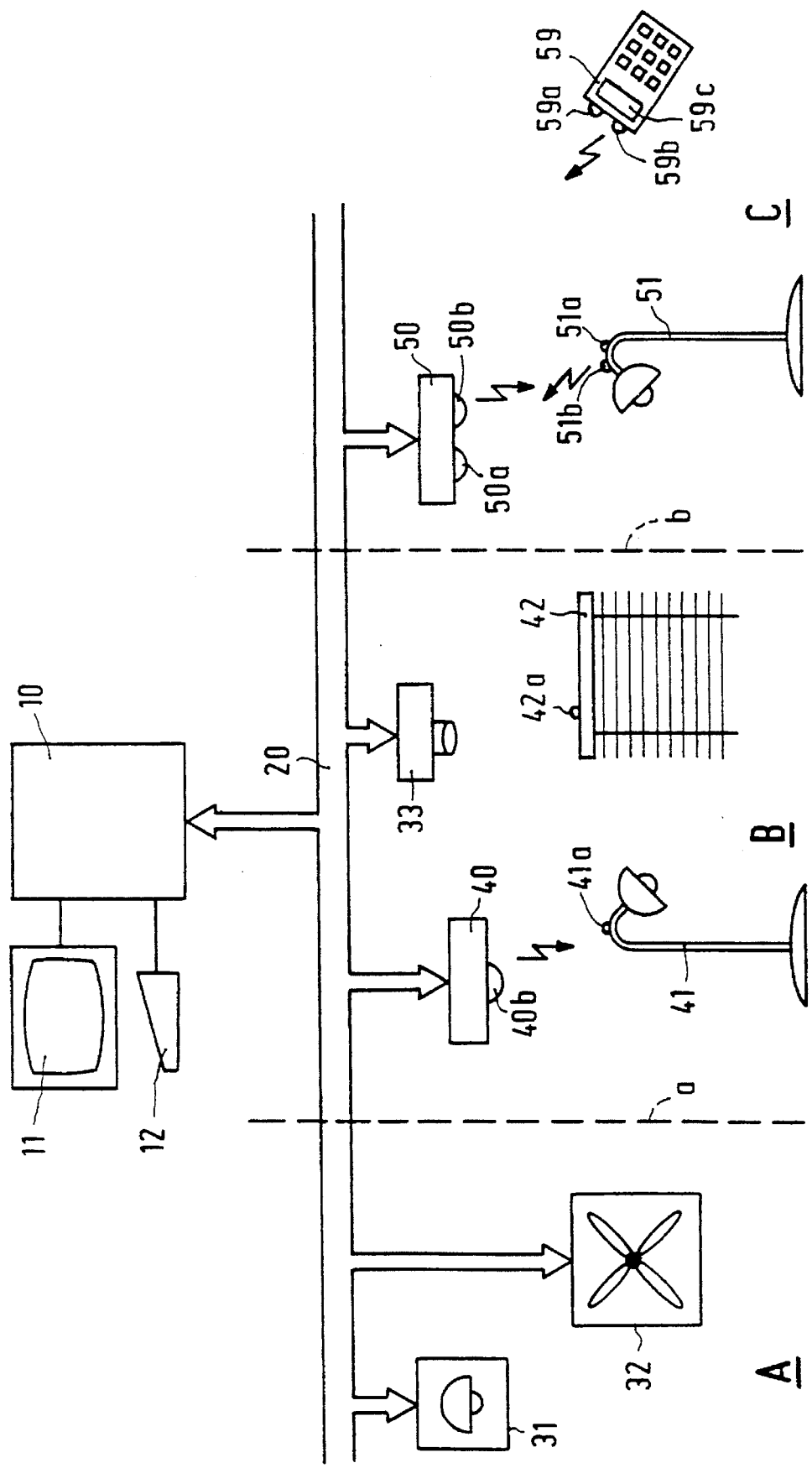
FIG. 1 diagrammatically shows an embodiment of a building management system in accordance with the invention.

In FIG. 1 a building management system according to the invention is diagrammatically shown. The system includes a control system 10, shown as a single processor such as a personal computer or a dedicated processor. Alternatively, the control system 10 may include several distributed processors linked together, some of these may be dedicated to specific tasks. For programming purposes and for entering and obtaining information about the system, the control system may have peripherals such as a display 11 and a keyboard 12. The control system is connected to a communication bus 20. The communication bus 20 is linked to various devices, shown are two appliances 31 and 32, for example a luminaire and a fan, and a sensor 33, for example a light sensor. The communication bus 20 is further connected to two transponders 40 and 50. The various devices may be placed in different spaces, as indicated by dashed lines a and b indicating walls between rooms A, B and C. In the rooms B and C, in which transponders 40 and 50 are placed, several further appliances 41, 42 and 51 are shown.

As an example, appliances 41 and 51 are shown as luminaires and appliance 42 is represented as a set of window blinds.

The appliances are regulated by signals emitted by the control system 10, in accordance to instructions entered in there. Normally the instructions will be comprised in a program which runs continuously in a processor of the control system and generates signals in response to information from sensors and built-in equipment such as a clock and a calender. Exceptionally, the signals may be generated by commands given by an operator to the control system via the keyboard 12. The signals are communicated to the appliances and other devices via the communication bus 20. Each device connected to the bus receives all the signals. As signals include address information, i.e. information identifying the destination, only the device or devices for which a signal is intended will react to the signal.

Extending the communication bus 20 to all appliances and sensors in a building is costly, in particular when appliances are moved, removed or added, because then changes have to be made to the wiring of the communication bus 20. This is the case even more when the internal lay-out of the building changes, for example when walls are removed and/or rearranged. To avoid this, in the building management system according to the invention transponders 40 and 50 are connected to the communication bus 20. The transponders 40 and 50 receive the signals from the communication bus 20, convert those signals into a wirelessly transmittible form and send them towards the appliances 41, 42 and 51 which are equipped with receivers 41a, 42a and 51a, respectively, to detect the signals.

Preferably the Wansmission between the transponders and the appliances occurs by infra-red signals (IR). As this does not penetrate walls the signals are confined to one room. However, other ways for wireless transmission, such as ultrasone or radio-frequency transmission may be used as well.

The first transponder 40 shown in FIG. 1 comprises several infra-red light emitting diodes (IR-LEDs), forming an IR-transmitter 40b, for transmitting IR signals more or less uniformly in the room B. Both appliances 41 and 42 receive all transmitted signals, via IR-receivers 41a and 42a, respectively. The transponder 40 may convert all signals on the communication bus to IR-signals emitted into the space. However, as only a fraction of the signals is intended for the appliances 41 and 42 a better way of operating the transponder is to select these signals in the transponder 40 and to retransmit only the ones relevant for the appliances 41 and 42 in the room B.

The second transponder 50 in room C comprises, in addition to an IR-transmitter 50b, an IR-receiver 50a. The appliance 51 comprises an IR-receiver 51a and an IR-transmitter 51b. When a signal is received by the receiver 51a of the appliance 51, a return signal is transmitted from the appliance 51 to the transponder. This signal may be an acknowledgement that the initial signal has been received correctly or it may contain status information about the appliance's status when the initial signal requested such information. When the appliance 51 is a luminaire which can be dimmed, such status information may be the dimming level.

In addition to signals from the control system 10, a user in the space can overrule the setting of an appliance by using a remote control unit 59. In response to commands given by the user the remote control unit emits signals which are received by the receiver 51a of the appliance 51. In order to signal to the building management system the changed status of the appliance various possibilities exist. First, the appliance can emit, via its transmitter 51b, a signal to the receiver 50a of the transponder 50 that its status has changed or, secondly, the control system 10 can interrogate at regular intervals the status of each appliance for its present status. As a third possibility the transponder 50 can interrogate at regular intervals and transmit the status of the appliance 51 only when the appliance's status has changed.

The remote control unit 59 is optionally provided with an IR-receiver 59a and a display 59c or any other device for communication to a human operator. Two-way communication between the occupant of the space and the system is herewith provided.

As identical equipment may be present in other rooms of the same building, and as these other pieces of equipment are regulated by the same control system, each piece of equipment must have a unique address. To avoid the subsequent large number of different addresses to be set in the appliances, and to allow easy interchangeability between pieces of equipment, each transponder in the system is provided with a unique address of itself and passes only signals to the appliances within its reach when the signal on the communication bus 20 comprises this transponder's address. The address in a signal sent by the control system 10 on the communication bus 20 then comprises both a unique transponder address and a, not unique, appliance address. Moving an appliance from one space to another or, what is equivalent, from one transponder to another, means that no change in the equipment is to be made. Only the system, i.e. the transponders and the control system 10, have to be informed, preferably the information is shared via the communication bus 20.

Figure 2A:
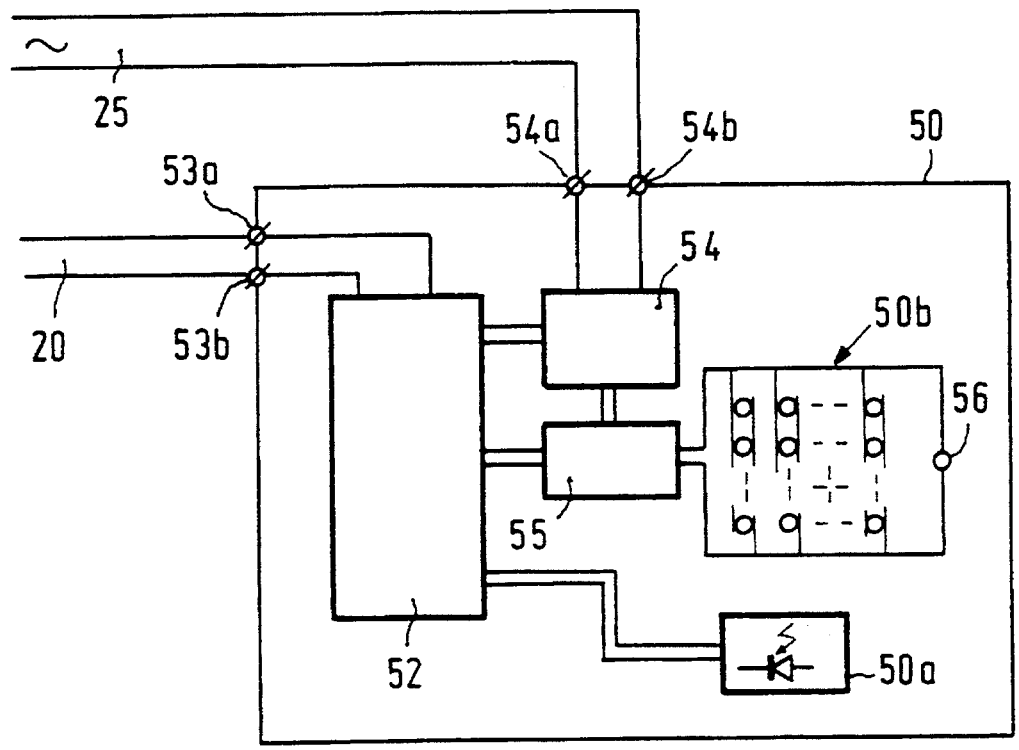
FIGS. 2a and 2b show a transponder in accordance with the invention.
Figure 2B:
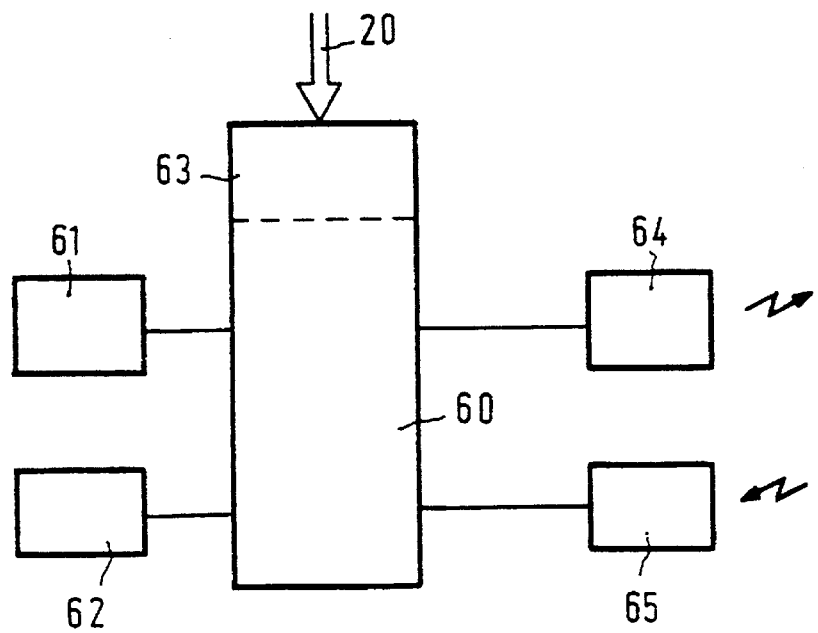

FIGS. 2a and 2b show diagrammatically a transponder 50 for use in a building management system according to the invention. The transponder in FIG. 2a contains a processor 52 for conversion of the signals on the communication bus 20 to IR signals that can be transmitted via transmitter 50b, shown as a block of IR-LEDs. For example, the processor is a microprocessor of the type Intel 8051. A pair of terminals 53a and 53b connects the microprocessor with the communication bus 20. If required, the transponder is provided with an interface, not shown, to convert electrical signals such as voltage levels occurring at the communication bus to electrical signals required at the input of the microprocessor.

The transponder further comprises power supply terminals 54a and 54b for connection of a power supply unit 54 to a power line 25, for example the mains. As the block of IR-LEDs may consume quite a lot of power to generate sufficiently strong IR-signals for reaching faraway or partly hidden receivers that make reflection necessary, supply by an internal source such as a battery, or via the communication bus may not provide sufficient power. The total optical power to be generated to ensure successful operation in an office environment is in the order of magnitude of one Watt. The electrical power needed to generate that optical power is twenty to forty times that value, to be consumed during transmission.

In.between the processor 52 and the block of IR-LEDs 50b, an interface-unit 55 is arranged to provide the block of IR-LEDs 50b with sufficient power in response to the output signals generated by the processor 52. For maintenance purposes an additional LED 56 is included parallel to the block of IR-LEDs 50b. The additional LED 56 emits light in the visible range and is to be used to easily obtain information whether the block of IR-LEDs 50b is activated. In front of the block of IR-LEDs 50*b* an optical system, not shown, may be arranged to disperse the radiation emitted by the transmitter 50*b* in the space.

The transponder 50, as shown in the FIG. 2*a*, is provided with an IR-receiver 50*a* coupled with the processor 52.

In FIG. 2*b* a functional diagram of an embodiment of the transponder 50 is shown. The kernel of the transponder is a microprocessor 60 which selects incoming messages, and decides whether to convert them into another format and to retransmit them. For this purpose the microprocessor 60 is provided with, or connected to, a read-only memory 61 with a computer program loaded into it and/or a programmable memory 62 for storing modifiable data about the system, such as the appliances served by this transponder. The processor further comprises an interface 63 to the communication bus 20, an IR-transmitter 64 and an IR-receiver 65. The indicated bus interface 63 is a functional unit and may be a pan of a program running in the microprocessor 60.

A message entering via the communication bus 20 is checked for its integrity and destiny in the bus interface 63. When the message on the communication bus is intended for this transponder or an appliance served by this transponder, the bus interface 63 will return an acknowledge signal on the communication bus. If a message on the communication bus is incomprehensible or is not intended for this transponder no acknowledgement is returned by the bus-interface. An accepted message is passed to the microprocessor 60, and processed there. When the message is intended for one of the appliances served by the transponder, the message is converted into the proper IR transmission format and transmitted via the transmitter 64. In addition to messages for the appliances, a message could be used for modifying the internal settings of the transponder, for example signalling that an appliance is added or removed from the set served by this transponder. In that case the message causes the contents of the programmable memory 62 to be updated.

In a further development of the system, the transponder may comprise an IR-receiver 65. This receiver can be used, for example, for receiving acknowledge signals from the appliances. Absent an acknowledge signal within a predetermined interval, the microprocessor will retransmit the last message via the transmitter 64. After a preset number of trials, an error message can be transferred via the communication bus to a central control system. Another use of the receiver 65 is to provide communication between a IR remote control unit and the transponder and, via the communication bus 20, the building management system. The transponder, or the system, is then programmable using a, special, remote control unit.

Certain messages, received by the IR-receiver 65 and not intended for the transponder or the system, but for the appliances served, can be retransmitted after a few milliseconds via the IR-transmitter 64. It is then ensured that the appliances will receive sufficiently powerful signals, even when the signal from a remote control unit is weak. As is the case with messages received from the communication bus, the transponder may filter or modify messages received via the receiver 65 before retransmission via the transmitter 64. This allows, for example, the use of the same or a similar remote control unit in different rooms or in different situations for different appliances. An "up" or "down" signal received by the transponder is then to be transmitted as an "up" or "down" signal for window blinds or for lamps, depending on the equipment around, the light level, the time of day, or any other relevant parameter.

A building management system according to the invention can be extended or complemented with other devices communicating with the control system and the transponders via the bus. Such other devices are, for example, sensors, such as a light sensor and/or a presence detector, which signal that a space should become illuminated. Via the bus, the transponder then "knows" which appliances should be turned on via transmission of IR-signals. Another example is a local control unit for checking the use and performance of the appliances served by a group of several transponders. Sensors and control units can be constructionally integrated with a transponder.

I claim:

1. Building management system, comprising:

various appliances for building service functions, a control system for control and regulation of said appliances, a communication bus for communication of signals between the control system and the appliances, and wherein at least one of the appliances, is wirelessly controlled and includes a receiver for receiving wirelessly transmitted signals, and a transponder coupled to the communication bus for establishing a wireless link between the communication bus and the wireless appliance to be controlled, in that the transponder comprises a transponder address, which uniquely identifies the transponder on the communication bus, and wherein each wirelessly controlled appliance comprises an appliance address, in that the signals from the control system to the wireless appliance to be controlled comprise the transponder address and the address of the wireless appliance to be controlled, in that the transponder wirelessly transmits signals to the wireless appliance to be controlled in response to signals present on the communication bus comprising its transponder address.

2. The building management system according to claim 1, characterized in that the signals on the communication bus include signals meant to be wirelessly transmitted to the appliances and signals not meant to be wirelessly transmitted to the appliances and the building management system further includes appliances connected to the communications bus for responding to the signals not meant to be wirelessly transmitted and wherein the transponder comprises a transmitter for generating signals for wireless transmission and a processor for conversion of signals received via the communication bus into a format suitable for wireless transmission, wherein the processor includes means for distinguishing between the signals meant to be wirelessly transmitted to the appliances and the signals not meant to be wirelessly transmitted and for transmitting only signals meant to be wirelessly transmitted.

3. The building management system according to claim 2, characterized in that one of the appliances is provided with a transmitter for wireless transmission of signals, and the transponder comprises a receiver for receiving wirelessly transmitted signals.

4. The building management system according to claim 3, characterized in that the appliance which includes a transmitter also comprises acknowledgement means for transmitting an acknowledgement signal after receipt of a signal from the transponder and in that the transponder comprises means for repeating a previously transmitted signal when no acknowledgement signal is received.

5. The building management system according to claim 4, characterized in that the system further comprises a portable remote control unit for wireless transmission of signals to the appliances.

6. The building management system according to claim 5, characterized in that the transponder comprises a receiver for receiving signals wirelessly transmitted by the remote control unit and in that the transponder comprises means for retransmitting a signal received from the remote control unit, over one of the communication bus and the transmitter of the transponder.

7. The Building management system according to claim 6, characterized in that the transponder comprises means for filtering and modifying of a signal received from the remote control unit prior to retransmission thereof.

8. The Building management system according to claim 5, characterized in that the remote control unit comprises a receiver for receiving signals wirelessly transmitted by the transponder and display means for displaying messages transmitted by said transponder.

9. The building management system according to claim 8, characterized in that the transmitter of the transponder is an infra-red transmitter for transmitting infrared signals having a power level, the receiver of the appliance is an infra-red receiver for receiving infrared signals of at least a minimum power level, and wherein the ratio between the power level of the infra-red signals transmitted by said transmitter and the minimum power level is of the order of magnitude of $10^8$.

10. A transponder, suitable for use in a building management system including i) various wirelessly controlled appliances for building service functions wherein the appliances each include an appliance address and a receiver for receiving wirelessly transmitted signals, ii) a control system for control and regulation of the appliances, and iii) a communication bus for communication of signals between the control system and the appliances, said transponder comprising:

i) a transponder address which uniquely identifies the transponder on the communication bus;

ii) a transmitter for generating the wirelessly transmitted signals to the appliances addressed by the control system thereby establishing the wireless link between the communication bus and the appliances addressed by the control system in response to signals on the communication bus which include the transponder address and the address of the appliances addressed by the control system;

iii) data terminals for connection to the communication bus; and iv) a processor connected to said data terminals and said transmitter for converting a selected set of the signals received via the data terminals into a format suitable for wireless transmission by said transmitter to said appliances addressed by the control system.

11. The building management system according to claim 3, characterized in that the transmitter of the transponder is an infra-red transmitter for transmitting infrared signals having a power level, the receiver of the appliance is an infra-red receiver for receiving infrared signals of at least a minimum power level, and wherein the ratio between the power level of the infra-red signals transmitted by said transmitter and the minimum power level is of the order of magnitude of $10^8$.

12. The building management system according to claim 1, characterized in that one of the appliances is provided with a transmitter for wireless transmission of signals, and the transponder comprises a receiver for receiving wirelessly transmitted signals.

13. The building management system according to claim 12, characterized in that the transmitter of the transponder is an infra-red transmitter for transmitting infrared signals having a power level, the receiver of the appliance is an infra-red receiver for receiving infrared signals of at least a minimum power level, and wherein the ratio between the power level of the infra-red signals transmitted by said transmitter and the minimum power level is of the order of magnitude of $10^8$.

14. The building management system according to claim 1, characterized in that the transmitter of the transponder is an infra-red transmitter for transmitting infrared signals having a power level, the receiver of the appliance is an infra-red receiver for receiving infrared signals of at least a minimum power level, and wherein the ratio between the power level of the infra-red signals transmitted by said transmitter and the minimum power level is of the order of magnitude of $10^8$.

15. The Building management system according to claim 1, characterized in that the system further comprises a portable remote control unit for wireless transmission of signals to the appliances.

16. A building management system, comprising:

a plurality of wirelessly controlled appliances for building service functions, each of the appliances comprising an appliance address and a receiver for receiving wirelessly transmitted signals wherein each appliance address differs only from addresses of other appliances of a different type but is the same address as addresses of appliances of the same type;

control means for controlling and regulating said plurality of appliances;

a communication bus for communication of signals between the control system and the appliances; and a transponder, having a transponder address which uniquely identifies the transponder, coupled to the communication bus for wirelessly transmitting signals to said appliances in response to signals present on the communication bus which signals include the transponder address and the address of the appliance to be controlled, thereby establishing a wireless link between the communication bus and the appliance to be controlled.

17. The building management system according to claim 16, wherein the transponder includes an infra-red transmitter for transmitting infrared signals having a power level, the receiver of the appliance is an infra-red receiver for receiving infrared signals of at least a minimum power level, and the ratio of the power level of the infra-red signals transmitted by said transmitter and the minimum power level is of the order of magnitude of $10^8$.

18. The building management system according to claim 16, wherein said appliance includes a transmitter for wireless transmission of signals, and the transponder comprises a receiver for receiving wirelessly transmitted signals.

19. A transponder, suitable for use in a building management system, the building management system comprising:

various wirelessly controlled appliances for building service functions wherein the wirelessly controlled appliances include a receiver for receiving wirelessly transmitted signals and wherein the wirelessly controlled appliances each include an appliance address;

a control system for control and regulation of said appliances; and a communication bus for communication of signals between the control system and the appliances, wherein said transponder is coupled to the communication bus for establishing a wireless link between the communication bus and the appliances, and wherein the transponder comprises:

i) a transponder address which uniquely identifies the transponder on the communication bus;
ii) a transmitter for generating the wirelessly transmitted signals to said wirelessly controlled appliances in response to signals on the communication bus which signals include the transponder address and the address of the appliance to be controlled;
iii) data terminals for connection to the communication bus; and
iv) a processor connected to the data terminals and the transmitter for converting a selected set of the signals received via the data terminals into a format suitable for wireless transmission by said transmitter to said appliances to be controlled.

20. The transponder according to claim 19, characterized in that the transmitter is an infra-red transmitter for transmitting infrared signals having a power level, the receiver of the appliance is an infra-red receiver for receiving infrared signals of at least a minimum power level, and the ratio of the power level of the infra-red signals transmitted by said transmitter and the minimum power level is of the order of magnitude of $10^8$.

21. Building management system as claimed in claim 1, wherein the system comprises at least two types of wireless appliances, the appliance address being unique to the type of appliance and the same for all appliances of a given type.

* * * * *